United States Patent
Amaral et al.

(10) Patent No.: US 9,920,717 B2
(45) Date of Patent: Mar. 20, 2018

(54) PREHEATING DEVICE FOR A FUEL INJECTION SYSTEM

(71) Applicant: Mahle International GmbH, Stuttgart (DE)

(72) Inventors: Tadeu Amaral, Sao Paulo (BR); Roberta Cruz, Taubaté (BR); Fernando Yoshino, Jundial (BR); Fabio Moreira, Vinhedo (BR); Juergen Stehlig, Neckartenzlingen (DE); Patrik Klingbacher, Wolfsberg (AT); Werner Schadler, Seggauberg (AT); Mario Wetzl, Kuehnsdorf (AT)

(73) Assignee: Mahle International GmbH (DE)

( * ) Notice: Subject to any disclaimer, the term of this patent is extended or adjusted under 35 U.S.C. 154(b) by 126 days.

(21) Appl. No.: 14/441,832

(22) PCT Filed: Oct. 22, 2013

(86) PCT No.: PCT/EP2013/072076
§ 371 (c)(1),
(2) Date: May 8, 2015

(87) PCT Pub. No.: WO2014/072171
PCT Pub. Date: May 15, 2014

(65) Prior Publication Data
US 2015/0300300 A1    Oct. 22, 2015

(30) Foreign Application Priority Data
Nov. 9, 2012  (DE) .................. 10 2012 220 429

(51) Int. Cl.
*F02G 5/00*    (2006.01)
*B60L 1/02*    (2006.01)
(Continued)

(52) U.S. Cl.
CPC ........ *F02M 31/125* (2013.01); *F02M 51/005* (2013.01); *F02M 53/02* (2013.01);
(Continued)

(58) Field of Classification Search
CPC ...... F02M 31/125; F02M 53/02; F02M 31/02; F02M 51/005; F02M 53/06;
(Continued)

(56) References Cited

U.S. PATENT DOCUMENTS

| | | |
|---|---|---|
| 4,866,250 A | 9/1989 | Pasbrig |
| 4,990,748 A | 2/1991 | Starck |

(Continued)

FOREIGN PATENT DOCUMENTS

| | | |
|---|---|---|
| DE | 3617679 A1 | 12/1987 |
| DE | 3902206 A1 | 8/1990 |

(Continued)

OTHER PUBLICATIONS

English Abstract for FR 2876161.
(Continued)

*Primary Examiner* — David Hamaoui
*Assistant Examiner* — Syed O Hasan
(74) *Attorney, Agent, or Firm* — Fishman Stewart PLLC

(57) ABSTRACT

A preheating device for an internal combustion engine may include an inlet connection for connecting a distributor rail of a fuel injection system and an outlet connection for connecting a fuel injector of the fuel injection system. A preheating chamber may be fluidically connected with the inlet connection and the outlet connection and be flowable through by a fuel flow. At least one electrical heating element may be included for heating the fuel flow in the preheating chamber. At least one metallic heating body, (Continued)

which may be exposed to the fuel flow in the preheating chamber, may receive the at least one heating element.

18 Claims, 17 Drawing Sheets

(51) Int. Cl.
    *F02M 31/125*     (2006.01)
    *F02M 51/00*     (2006.01)
    *F02M 53/02*     (2006.01)
    *F02M 53/06*     (2006.01)
    *F02M 69/46*     (2006.01)
    *F02M 63/02*     (2006.01)

(52) U.S. Cl.
    CPC .......... *F02M 53/06* (2013.01); *F02M 69/465* (2013.01); *F02M 63/0225* (2013.01); *F02M 2200/60* (2013.01); *F02M 2200/80* (2013.01); *F02M 2200/95* (2013.01); *Y02T 10/126* (2013.01)

(58) Field of Classification Search
    CPC ............. F02M 69/465; F02M 63/0225; F02M 2200/60; F02M 2200/80
    USPC ........ 123/445, 549, 545; 392/448, 468, 478, 392/480; 219/207, 205
    See application file for complete search history.

(56) References Cited

U.S. PATENT DOCUMENTS

| | | | | |
|---|---|---|---|---|
| 5,401,935 | A * | 3/1995 | Smith | ................... F02M 57/00 219/206 |
| 6,847,017 | B2 | 1/2005 | Starck et al. | |
| 2009/0294552 | A1* | 12/2009 | Trapasso | ............. F02M 51/061 239/132 |

FOREIGN PATENT DOCUMENTS

| | | |
|---|---|---|
| DE | 29911711 U1 | 10/1999 |
| DE | 1014007 A1 | 2/2003 |
| DE | 20216509 U1 | 2/2004 |
| DE | 202005006326 U1 | 8/2006 |
| DE | 102009001062 A1 | 8/2010 |
| EP | 0198414 * | 10/1986 |
| EP | 0198414 A2 | 10/1986 |
| EP | 1889910 A2 | 2/2008 |
| FR | 2876151 A1 | 4/2006 |
| FR | 2876161 A1 | 4/2006 |
| GB | 1034594 A | 6/1966 |
| GB | 2454022 * | 4/2009 |
| GB | 2454022 A | 4/2009 |
| JP | S61243249 A | 10/1986 |
| JP | 3006862 U | 1/1995 |
| JP | 2010-101294 A | 5/2010 |
| JP | 2010101294 * | 5/2010 |
| JP | 2010169087 A | 8/2010 |
| JP | 2011196365 A | 10/2011 |
| WO | WO-97/37121 A1 | 10/1997 |

OTHER PUBLICATIONS

English abstract for DE-10140071.
English abstract for DE-102009001062.
English abstract for FR-2876151.
English abstract for DE-3617679.
English abstract DE-202005006326.
English abstract for JP-2010-101294.
Japanese Office Action and English translation thereof dated Jun. 6, 2017, related to corresponding Japanese Patent Application No. 2015-541070.

\* cited by examiner

PREHEATING DEVICE FOR A FUEL INJECTION SYSTEM

CROSS REFERENCE TO RELATED APPLICATIONS

This application is a US National Phase Application of PCT/EP2013/072076, filed on Oct. 22, 2013, which claims priority to German Patent Application No. DE 10 2012 220 429.6, filed Nov. 9, 2012, the contents both of which is hereby incorporated by reference in their entirety.

TECHNICAL FIELD

The present invention relates to a preheating device for a fuel injection system of an internal combustion engine, which is arranged in particular in a motor vehicle. The invention relates in addition to a fuel injection system for an internal combustion engine which is equipped with at least one such preheating device.

BACKGROUND

In internal combustion engines which are to be operated with a fuel which has a high viscosity at low temperatures, the problem exists that by means of such fuels no ignitable mixture can be generated in the combustion chambers of the internal combustion engine for the starting of the internal combustion engine, i.e. for starting up the internal combustion engine at these low temperatures. In so-called "biofuels", in particular bio diesel, this problem already occurs at temperatures below +14° C. Other biofuels, such as for example ethanol and methanol, are characterized by a flash point of approximately 12° C., which is very high compared with the flash point of conventional petrol, which is at approximately −42°. Consequently, such biofuels have a low volatility compared with petrol and require a high vaporization heat compared with petrol. In such biofuels, such as ethanol and methanol, these characteristics lead to critical situations for the starting of an internal combustion engine under cold environmental conditions, because such biofuels require a great amount of heat in order to generate an injection spray which is suitable for an ignition and for starting the internal combustion engine.

This problem can be countered by two fundamentally different approaches to a solution. In a first solution approach, a second fuel system can be provided for operating the internal combustion engine, which makes it possible to operate the internal combustion engine with a different fuel for its start-up which is also easily ignitable at lower temperatures, in order to thus start it up. However, such a solution is very complex and accordingly expensive. Furthermore, the problem arises here that the vehicle driver must monitor two different fuel tanks or respectively the filling levels thereof, and must also not confuse these when refueling.

A second solution approach is based on the general idea of preheating the fuel which is difficult to ignite for the starting process of the internal combustion engine. By preheating the fuel, its temperature and ignitability are increased. In particular, the viscosity is thereby reduced. The preheating devices named in the introduction come into use in this connection.

From DE 101 40 071 A a separate heating circuit is known for the heating of the fuel, wherein an injection nozzle, which is configured specifically for this, has an additional connection for the heating circuit. Such a solution is complex and requires a comparatively great amount of installation space.

From DE 10 2009 001 062 A it is known to heat the fuel by heated valve air, wherein here, also, a specific injection nozzle is necessary.

From FR 2 876 161 A it is known to integrate a heating device into a fuel distributor rail. Here, a comparatively great volume of fuel is to be heated, in order to be able to provide the preheated fuel for the starting operation. This requires a comparatively great amount of electrical energy and time.

From EP 1 888 910 B1 a fuel injection system is known which has a distributor rail for the provision of liquid fuel. In addition, several preheating devices of the type named in the introduction are provided, which respectively contain a preheating chamber, which respectively have a heating element and which respectively are connected to the distributor rail via an inlet connection. Furthermore, several fuel injectors or injection nozzles are provided, which are respectively connected to such a preheating device via an outlet connection. For each fuel injector a fuel path is thereby produced which leads from the distributor rail through the respective preheating chamber to the respective fuel injector. In the known fuel injection system or respectively in the known preheating device, the respective heating element is configured as a glow rod or glow plug, which projects coaxially into the respective preheating chamber. Furthermore, in the known preheating device a housing containing the respective preheating chamber is made from metal and in the installed state is welded with the distributor rail.

SUMMARY

The present invention is concerned with the problem of indicating for a fuel injection system or respectively for a preheating device an improved embodiment, which is distinguished in particular by an efficient heat input into the fuel, so that a sufficient heating of the fuel is able to be achieved with comparatively little electrical energy in a comparatively short time.

This problem is solved according to the invention by the subject matter of the independent claim. Advantageous embodiments are the subject matter of the dependent claims.

The invention is based on the general ideal of equipping the respective preheating device with at least one metallic heating body, in which the at least one electrical heating element is situated and which is arranged in the preheating device so that it is exposed to the fuel. Hereby, it is achieved that the respective heating element can heat the respective heating body, so that the heating of the fuel takes place substantially by the heating body. Such a metallic heating body has a comparatively high thermal conductivity, which enables an efficient heat transmission to the fuel. In addition, by means of the heating body the surface coming into contact with the fuel can be enlarged significantly with respect to the surface of the respective heating element, which likewise increases the amount of heat which is able to be transferred. However, such a heating body can be configured particularly simply so that a direct contact can be avoided between fuel and heating element, so that the respective heating element therefore has no contact with the fuel. The preheating device can therefore be realized particularly simply so that the respective heating element heats the fuel exclusively indirectly, namely via the heating body. Such an embodiment is of particular advantage especially when heating elements are to be used which are sensitive with respect to the fuel, in particular are at risk of corrosion. Hereby, it is possible for example to use more favorably priced embodiments for the heating elements, the materials of which show a higher risk of corrosion.

An embodiment in which the respective heating element is a PTC element is particularly advantageous in this connection. "PTC" stands here for "Positive Temperature Coefficient". PTC elements are distinguished in that they convert electrical energy into heat, wherein at the same time their electrical resistance increases exponentially with an increasing temperature. Consequently, PTC elements can be designed in a particularly simple manner so that they can reach and keep a predetermined temperature in a targeted manner with tension applied thereon. A complex electronic regulation or control is not necessary here, because the electrical resistance of the PTC element on reaching the predetermined temperature becomes, as it were, infinitely great. The use of such PTC elements therefore enables the desired preheating, without an electronic control or regulation of the heating element being necessary for this. In fact, basically therefore an electronic control can be omitted, however nevertheless an electronic control of reduced complexity can be provided, in order to control and/or monitor the respective PTC element. PTC elements can be realized for example particularly simply as flat plate bodies, i.e. as flat parallelepipeds, with two outer sides having a relatively large area, facing away from one another, which at the same time form the two electrical contacts or connections of the PTC element. Favorably priced PTC elements show a comparatively high risk of corrosion in connection with fuels. By the use of at least one heating body proposed according to the invention, in which the respective heating element is housed, a direct contact between the respective heating element and the fuel can be easily avoided, so that favorably priced PTC elements can be used as heating elements.

In accordance with another advantageous embodiment, a first electro-connection and a second electro-connection can be provided, which are able to be connected to an electrical energy supply, in order to supply the respective heating element with electrical energy. The first electro-connection can now be electrically connected with a contact element, preferably directly, which in turn is electrically connected with a first electrical connection of the respective heating element, preferably directly. The second electro-connection, on the other hand, can be electrically connected with the respective heating body, preferably directly, which in turn is electrically connected with a second electrical connection of the respective heating element, preferably directly. The invention utilizes the knowledge here that the metallic heating body in turn is electrically conductive, so that in accordance with the present proposal it is integrated into the electrical contacting of the respective heating element. Hereby, the electrification of the respective heating element is simplified, because additional electrical conductors and an electrical isolation necessary for this can be dispensed with.

In accordance with an advantageous further development, the contact element can be configured as a spring which prestresses the respective heating element against the heating body. Hereby, the contact element is given a dual function, which on the one hand creates the electric connection between the first electro-connection and the first electrical connection of the respective heating element, and on the other hand braces the respective heating element with the associated heating body, whereby on the one hand the electrical contacting between the heating body and the second electrical connection of the heating element, and on the other hand the heat transmission between heating element and heating body is improved.

In another embodiment, the respective heating element can be completely and tightly surrounded by the respective heating body. Hereby, the respective heating element is encapsulated hermetically tightly by the respective heating body. Hereby, a contacting between fuel and heating element can be avoided with a high degree of certainty. In addition, the inserting of the heating body into the preheating chamber is simplified thereby.

In another embodiment, the respective heating body can have at least one inner shell and at least one outer shell, between which the respective heating element is arranged. Between the inner shell and the outer shell, an intermediate space can be created particularly simply for housing at least one heating element, which in addition can be tightly closed in a particularly simple manner. For example, this intermediate space can be plugged with a suitable sealing compound, e.g. synthetic resin.

In another advantageous embodiment, the respective heating body can be configured so that in the installed state it surrounds the preheating chamber, wherein the heating body has an inlet fluidically connected with the inlet connection, and an outlet fluidically connected with the outlet connection. The heating body is inserted here into a housing of the preheating device, which housing has the inlet connection and the outlet connection. In addition, the heating body is sealed with respect to the housing, such that the fuel can only come into contact with an inner side of the heating body facing the preheating chamber. Through this construction, several heating elements can be housed particularly simply in the heating body, which heating elements are arranged distributed in the peripheral direction, whereby an intensive heating of the heating body can be realized.

According to an advantageous further development, the inlet connection can have an inlet connecting piece which projects inwards from the housing and in so doing opens out through the inlet of the heating body in the preheating chamber. The inlet connecting piece can be oriented here perpendicularly to the outlet connection. In particular, the inlet connecting piece can extend radially with respect to an axial direction of the heating body. Expediently, the inlet connecting piece is then a separate component with respect to the housing, which component is added on to the housing in a suitable manner. For example, the inlet connecting piece can be welded to the housing.

Furthermore, a sealing ring can be provided between the inlet connecting piece and the heating body. Additionally or alternatively, a sealing ring can be provided between the housing the heating body.

It is basically applicable to all embodiments that the inlet connection can be equipped with such an inlet connecting piece, which forms a separate component with respect to the housing and is added on to the housing, wherein a welded connection is preferred between the inlet connecting piece and the housing. In addition, the housing can have a cover which is separate with respect to the remaining housing and which closes a housing opening and is added on to the housing in a suitable manner. A welded connection is also preferred here. The electro-connections provided on the housing for the supply of the electrical heating elements with electrical energy are preferably directed tightly through the cover.

In another advantageous embodiment, the respective heating body can be configured as an axially open hollow body, which is arranged in the preheating chamber such that it comes in contact with the fuel by a radial outer side and by a radial inner side. Hereby, the surface of the heating body in contact with the fuel can be enlarged, which improves the efficiency of the heat transmission.

According to an advantageous further development, a housing can again be provided, which has the inlet connection and the outlet connection and which surrounds the preheating chamber. The housing can have in addition an outlet duct which originates from the outlet connection and projects axially into the preheating chamber. The respective heating body, configured as an axially open hollow body, can now be arranged in the housing so that it extends coaxially to the outlet duct. Hereby, a fuel path can be realized, which leads from the inlet connection through an outer gap between the housing and the outer side of the heating body, through an axial clearance between the housing and a face side of the heating body facing the outlet connection, through an inner gap between the outlet duct and the inner side of the heating body and through the outlet duct to the outlet connection. Hereby, a targeted flow guidance is realized along the heated surfaces of the heating body, which improves the heat transmission.

A further enlargement of the available surface of the heating body can be realized with the aid of a diagonal strut, which expediently extends over the entire height of the hollow heating body and thereby divides the interior, surrounded by the heating body, into two subspaces. Such a diagonal strut can be realized particularly simply in that two inner shells are inserted into an outer shell of the heating body, which inner shells lie against one another in the region of the diagonal strut and thereby form the diagonal strut. In so far as such a diagonal strut is provided, the outlet duct can be slotted axially, so that the diagonal strut is able to be inserted into two diametrically opposite longitudinal slots of the outlet duct. Hereby, at the same time, an improved positioning of the heating body in the housing is brought about.

According to another embodiment, the respective heating body can have a base section and a dipping section, originating from the base section, wherein the dipping section contains the respective heating element and dips into the preheating chamber so that it comes in contact on its outer side with the fuel, whereas the base section within a housing of the preheating device tightly closes the preheating chamber and has electro-connections for the supply of the at least one heating element with electrical energy. The heating body can therefore separate in the housing the preheating chamber, filled or respectively able to be filled with fuel, from a dry chamber, in which for example electrical contacts or respectively electrical lines run. Consequently, the heating elements can be inserted simply into the dipping section for example on a side facing away from the preheating chamber. For this, the heating body can have a through-opening in the base section, through which a receiving space, surrounded by the dipping section, is accessible for housing the respective heating element. This through-opening does not have to be tightly closed here, because it is open towards the dry chamber. In addition, the electrification of the heating elements is simplified thereby.

In addition, the dipping section and the base section are preferably formed integrally on the respective heating body, whereby a mounting and a separate sealing of the sections with respect to one another can be dispensed with.

In particular, the electro-connections can also be guided here through a cover of the housing, wherein this cover closes a housing opening through which the heating body is able to be inserted into the housing. The base section can have a closed circumferential seal on an outer contour, which seal closes the base section tightly with respect to the housing. An electrical isolator can be inserted into the base section or into the previously mentioned through-opening of the base section, in order to direct a contact element, which electrically connects the first electro-connection with the respective first electrical connection of the respective heating element, out from the receiving space of the heating body, surrounded by the dipping element, in an electrically isolated manner with respect to the heating body. The second electro-connection can be electrically connected directly with the heating body, preferably with the base section, in so far as here also the heating body, preferably with its dipping section, is contacted directly with the respective second electrical connection of the respective heating element.

In another advantageous further development, the dipping section can have on its outer side a flow duct which directs a fuel path, leading from the inlet connection to the outlet connection, in the peripheral direction at least partially around the dipping section. Hereby, the fuel path is lengthened significantly, which improves the heat input in the fuel. At the same time, the flow duct can provide an additional surface for heat transmission. For this, the flow duct is preferably metallic. In particular, the flow duct is formed integrally on the metallic heating body.

In an advantageous further development, this flow duct can project outwards from the dipping section and can wind helically around the dipping section. Hereby, a particularly efficient lengthening of the fuel path is achieved. Expediently, the flow duct extends in the peripheral direction at least over one complete winding, i.e. at least over 360°.

In another embodiment, the dipping section can have several ribs on its outer side, which extend transversely to an axial direction aligned to the outlet connection, and are spaced apart from one another in this axial direction, such that a fuel path leading from the inlet connection to the outlet connection leads through between adjacent ribs. These ribs also lead to a significant enlargement of the surface in contact with the fuel, which promotes the heat transmission. These ribs can extend in a closed manner here respectively in the peripheral direction, whereby they are able to be realized in particular as a plate stack, which has a plurality of plates forming the ribs, which plates are stacked on one another in the axial direction, wherein suitable measures, such as for example spacer elements, make provision that adjacent plates are spaced apart from one another. Alternatively, the heating body can be produced integrally from one piece with these plates or respectively with the ribs.

Alternatively, the ribs can also be formed by means of a strip material which is folded several times such that a plurality of folded sections run parallel to one another and spaced apart from one another and form the individual ribs. Adjacent ribs are then connected with one another via bend sections, in which the strip material is bent around approximately 180°.

Irrespective of the ribs being formed by means of separate plates or by means of a continuous strip material, the ribs can be perforated in order to improve transverse flows.

According to an advantageous further development, the dipping section can have a distributor duct running axially on an inlet side facing the inlet connection, which distributor duct leads through several or through all ribs. Through this inlet duct, the fed fuel can be distributed onto all ribs or respectively onto all intermediate spaces which are formed between adjacent ribs. This promotes a uniform action upon the ribs with fuel.

Additionally or alternatively, the outlet connection can be open towards the preheating chamber on an outlet side of the dipping section facing away from the inlet connection. It is hereby achieved that the fuel must flow through the intermediate spaces formed between the ribs, in order to be able to arrive from the inlet side of the dipping section, facing the inlet connection, to the outlet side of the dipping section, facing the outlet connection. This measure also leads to an improved heat transmission.

Additionally or alternatively, the dipping section can have an axially running collecting duct on its outlet side, facing the outlet connection, which collecting duct leads through several or through all ribs. The collecting duct leads together the partial flows of the fuel flowing through the intermediate spaces of the ribs, and reduces the flow resistance.

According to a particularly advantageous embodiment, the inlet connection can have a converging nozzle, i.e. a flow cross-section narrowing in the flow direction of the fuel. It has been found that such a nozzle, which opens out in the preheating chamber and hence in a sudden widening of cross-section, is advantageous with regard to reduced heat losses. The convergence of the nozzle can be comparatively keenly pronounced. For example, a nozzle outlet cross-section can be smaller by at least 50%, preferably by approximately 75%, than a nozzle inlet cross-section. According to a preferred embodiment which has already been mentioned, the respective heating element can be a PTC element. Preferably, several heating elements are used for each heating body. The individual heating elements are preferably flat plate bodies, e.g. with a rectangular cross-section, and can have a flat and parallelepiped-shaped geometry. Expediently, the heating elements which are used are identical parts, which increases the piece number and reduces the piece price.

A favorably priced producibility of the preheating device is also assisted in particular in that the housing can be made from plastic.

A fuel injection system according to the invention for an internal combustion engine, preferably a motor vehicle, comprises at least one distributor rail for the provision of liquid fuel, several preheating devices of the type described above, which are respectively connected to the distributor rail, and several fuel injectors, which are respectively connected to such a preheating device. A fuel path leads here from the distributor rail through the respective preheating chamber to the respective fuel injector.

Further important features and advantages of the invention will emerge from the subclaims, from the drawings and from the associated description of the figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
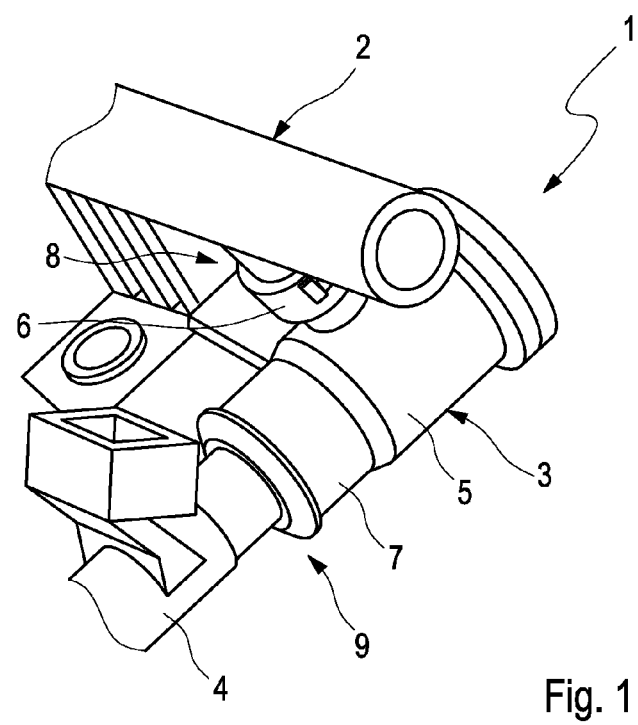
FIG. 1 an isometric view of a fuel injection system in the region of a preheating device, FIGS. 2-4 various views of the preheating device according to a first embodiment, FIGS. 5-9 various views of the preheating device according to a second embodiment, FIGS. 10-12 various views of the preheating device according to a third embodiment, FIGS. 13-16 various views of the preheating device according to a fourth embodiment, FIGS. 17-20 various views of the preheating device according to a fifth embodiment, FIG. 21 an isometric sectional view of a dipping section of the preheating device, in a further embodiment, FIG. 22 an isometric view of a rib constructed as a plate, FIG. 23 an isometric view of a rib structure of a dipping section in another embodiment of the preheating device.

According to FIG. 1 a fuel injection system 1, which in an internal combustion engine, which is not shown here, serves to supply combustion chambers of the internal combustion engine with fuel, comprises at least one distributor rail 2, several preheating devices 3 and several fuel injectors 4. The distributor rail 2, which can also be designated as "rail" or "common rail", serves for the provision of liquid fuel. The respective preheating device 3 serves for the preheating of the fuel before it arrives at the respective fuel injector 4. For this purpose, the preheating devices 3 are arranged fluidically between the distributor rail 2 and the respective fuel injector 4. Accordingly, the preheating device 3 comprises a housing 5, which has an inlet connection 6, by which the preheating device 3 is able to be connected directly to the distributor rail 2. In addition, the housing 5 has an outlet connection 7, via which the respective fuel injector 4 is able to be connected directly to the respective preheating device 3. A first plug connection 8 can be provided for connecting the preheating device 3 to the distributor rail 2. A second plug connection 9 can be provided for connecting the injector 4 to the preheating device 3. The respective plug connection 8, 9 can be designed here as a "pure" plug connection, in which the components which are to be plugged are only plugged into one another. An additional security can then be provided against withdrawal of the plugged components. Alternatively, the respective plug connection 8, 9 can also be designed as a bayonet closure, in which a plugging movement is combined with a rotary movement. Through the rotary movement, a security against withdrawal can be realized.

In accordance with FIGS. 2 to 20, the respective preheating device 3 therefore comprises the housing 5, which has the inlet connection 6 and the outlet connection 7 and in which a preheating chamber 10 is arranged. This preheating chamber 10 is fluidically connected with the inlet connection 6 and with the outlet connection 7, so that a fuel path 11, indicated by arrows in FIGS. 2 to 20, which leads from the inlet connection 6 to the outlet connection 7, leads through the preheating chamber 10. Furthermore, the preheating device 3 is equipped with at least one electrical heating element 12, by means of which the fuel can be heated in the preheating chamber 10. In the embodiments shown here, for each preheating device 3 respectively several heating elements 12 are provided, which are expediently respectively designed to be identical in construction. The heating elements 12 are preferably PTC elements, which are designed here as flat plates with a rectangular cross-section. Geometrically here this is respectively a flat parallelepiped.

Furthermore, the preheating device 3 is respectively equipped with at least one metallic heating body 13. This heating body 13 is arranged in the housing 5 and is exposed therein to the fuel. The heating elements 12 are arranged in the heating body 13. The heating body 13 forms a separate component with respect to the heating elements 12, into which separate component the heating elements 12 are inserted.

On the housing 5 in addition, two electro-connections are arranged, namely a first electro-connection 14 and a second electro-connection 15, which are able to be connected to an electrical energy supply and which serve to supply the electrical heating elements 12 with electrical energy. Expediently, these electro-connections 14, 15 are directed tightly through a cover 16 of the housing 6, which closes a mounting opening 17 of the housing 5, through which the heating body 13 is able to be inserted into the housing 5.

In the embodiments of FIGS. 2 to 4 and 10 to 20, the first electro-connection 14 is electrically connected directly with a contact element 18. The contact element 18 is electrically connected directly with a first electrical connection 19 of the respective heating element 12. The second electro-connection 15 is electrically connected directly with the respective metallic heating body 13. The heating body 13 is electrically connected directly with a second electrical connection 20 of the respective heating element 12. The two electrical connections 19, 20 of the respective heating element 12 are formed here by two outer sides, facing away from one another, of the plate-shaped heating element 12. Between the contact element 18 and the heating body 13, an electrical isolator 21 is expediently provided, in order to avoid an electrical contact between the contact element 18 and the heating body 13. The electrical isolator 21 can be, for example, a heat conducting film, e.g. silicon pad or a thin plate of aluminium nitride or aluminium oxide.

The contact element 18 can be configured as a spring or respectively can have at least an elastic section 22, wherein the elastic contact element 18 or respectively the respective elastic section 22 prestresses the respective heating element 12 against the heating body 13.

Figure 2:
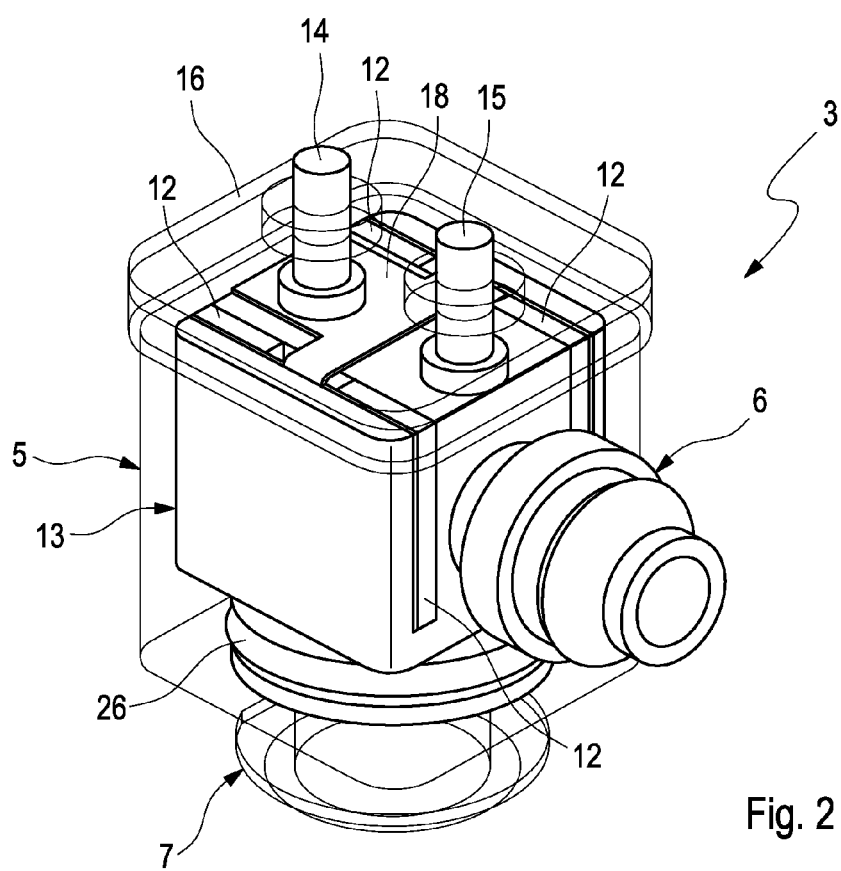
Figure 3:
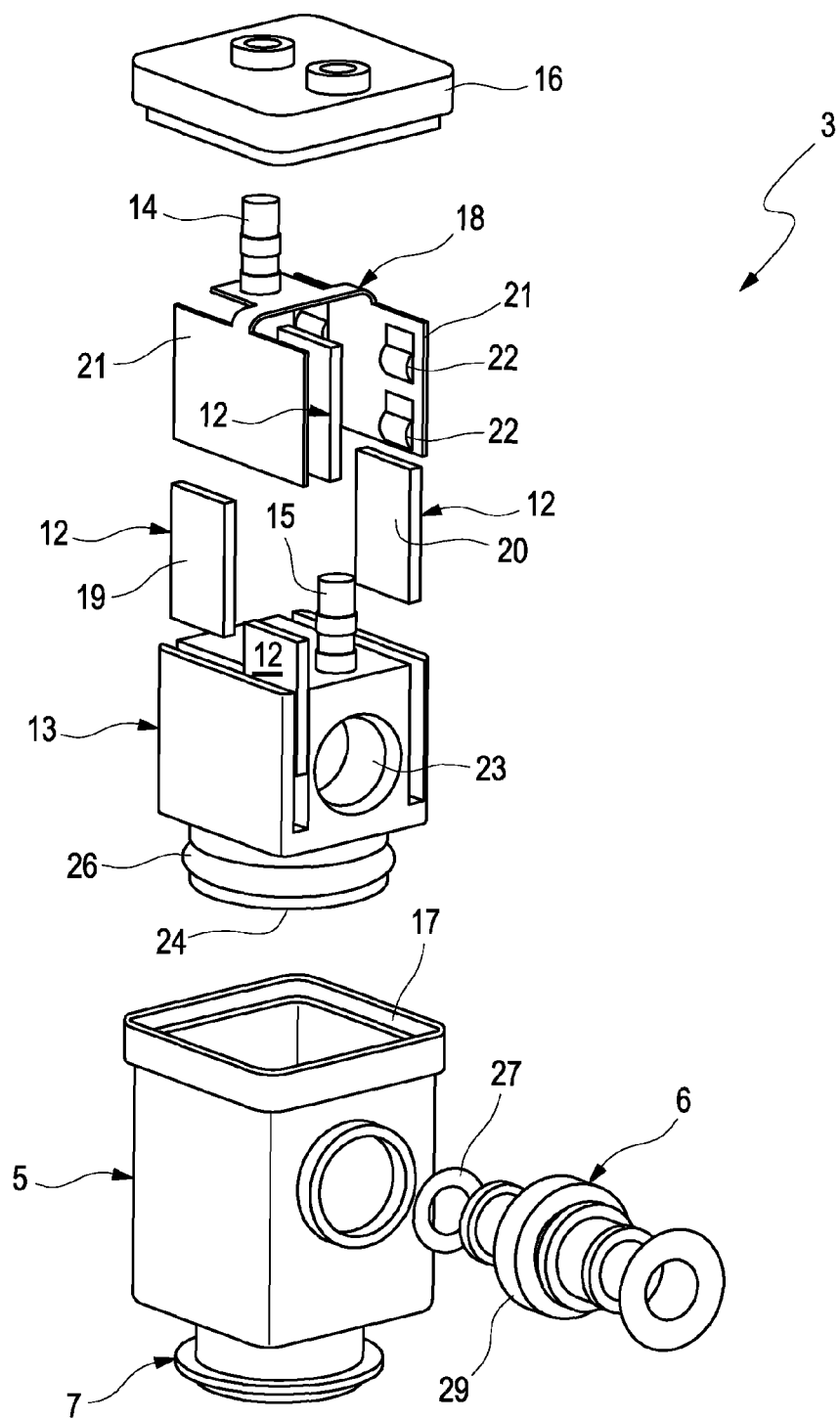
Figure 4:
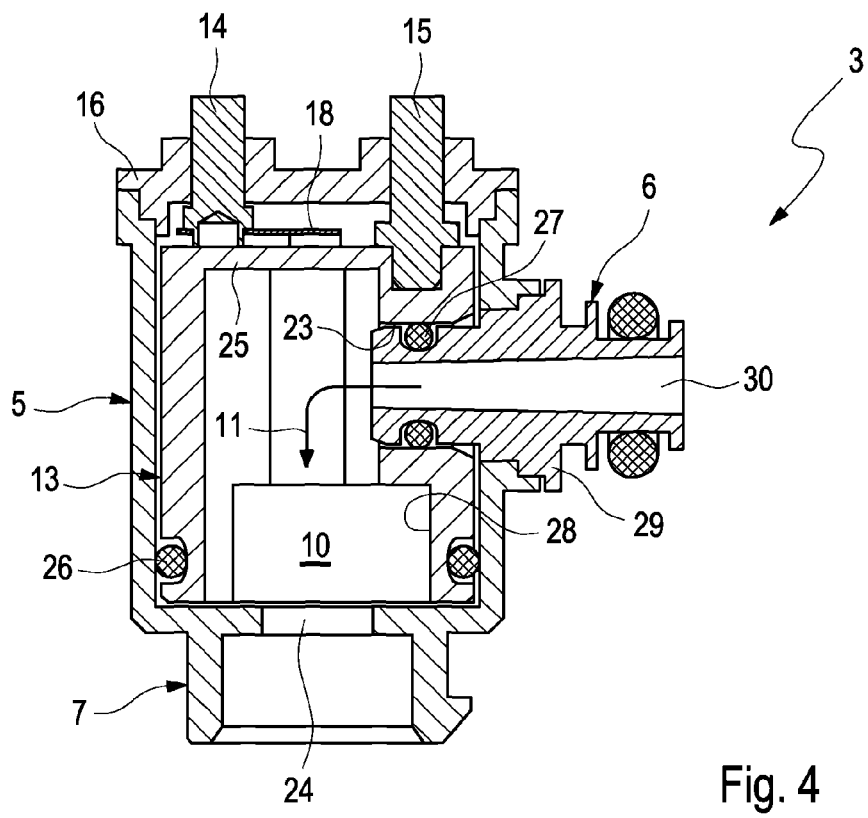
Figure 5:
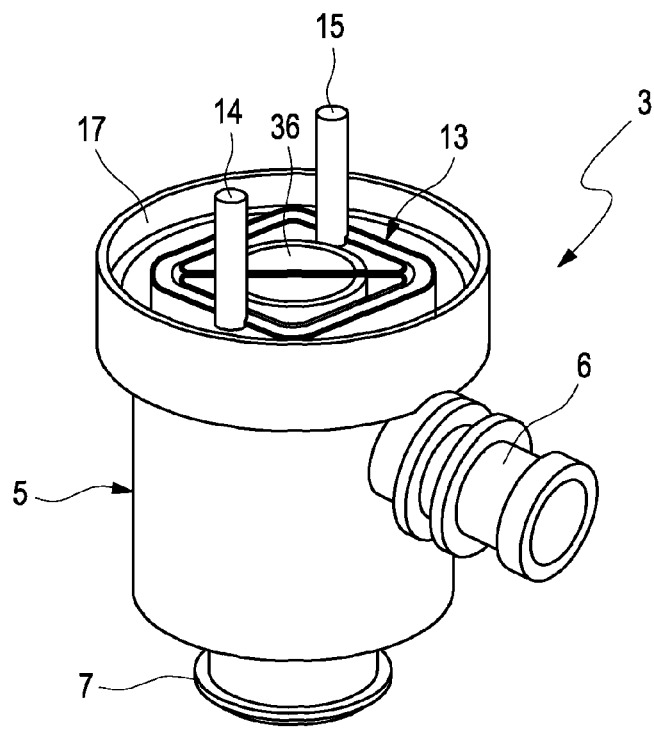
Figure 6:
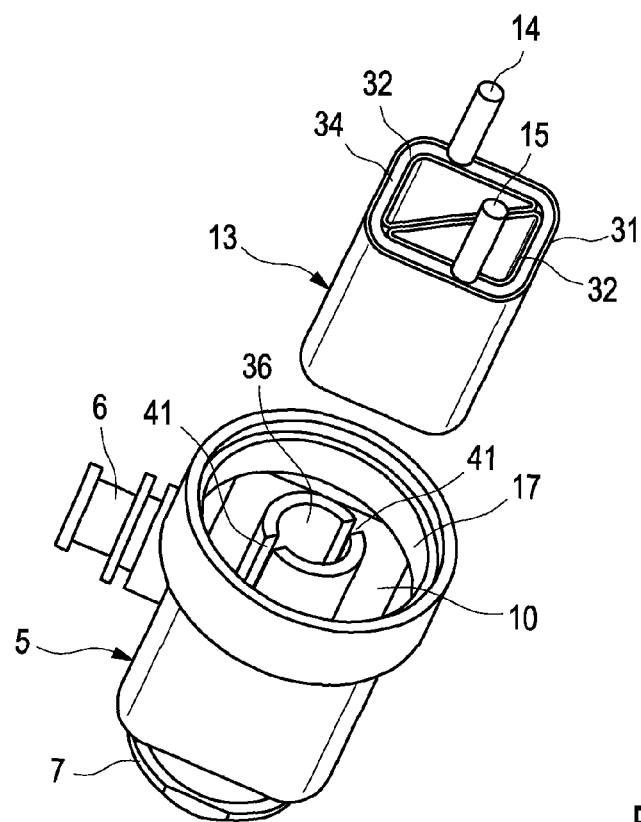
Figure 7:
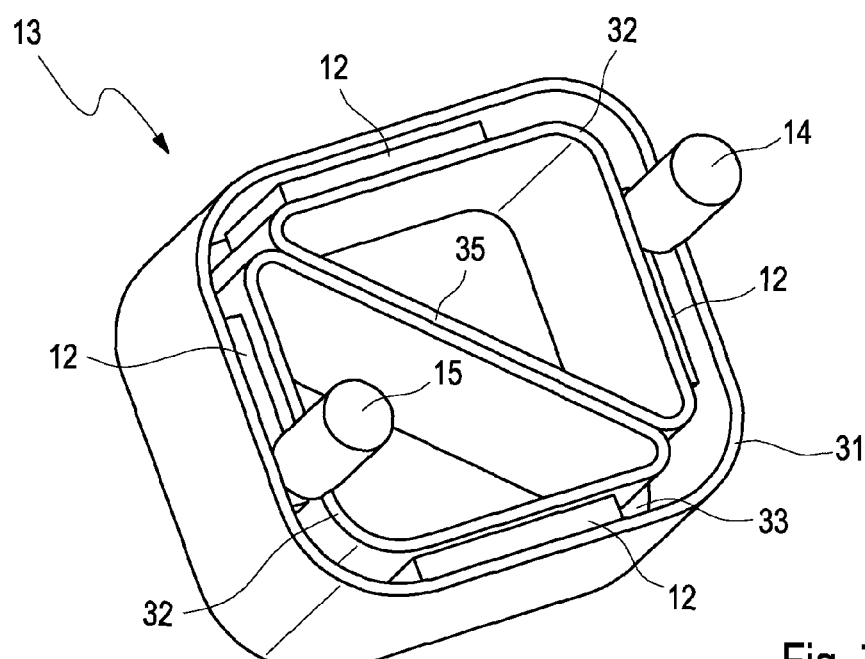
Figure 8:
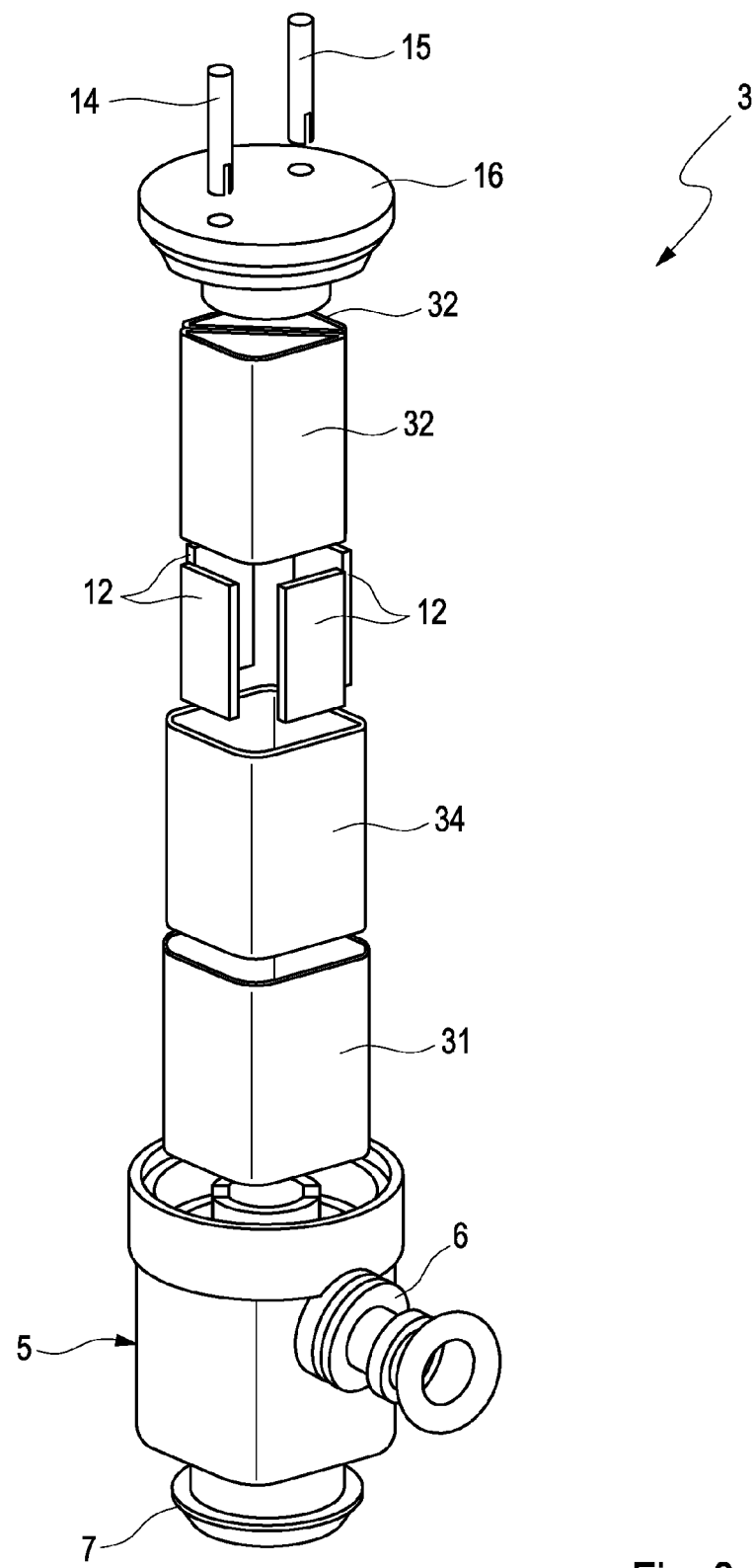
Figure 9:
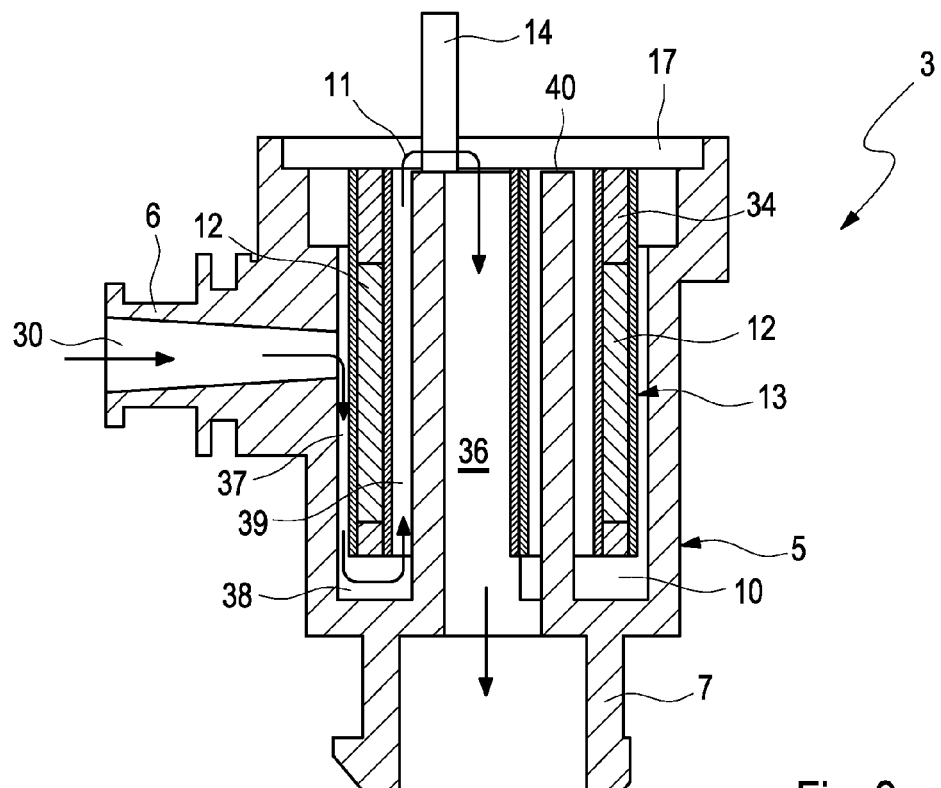

FIGS. 2 to 4 show a first embodiment of the preheating device 3. In this first embodiment, the heating body 13 is configured so that it surrounds the preheating chamber 10 in a peripheral direction. The heating body 13 has an inlet 23, fluidically connected with the inlet connection 6, and an outlet 24, fluidically connected with the outlet connection 7. The heating body 13 has a base 25 opposite its outlet 24, which base delimits the preheating chamber 10 axially. The inlet 23 is arranged laterally or respectively radially. In addition, the heating body 13 is sealed with respect to the housing 5. For this, a first sealing ring 26 is arranged between the housing 5 and the heating body 13. A second sealing ring 27 is arranged between the inlet connection 6 and the heating body 13. Hereby, the fuel can come in contact substantially only with an inner side 28 of the heating body 13 facing the preheating chamber 10. It is clear that basically also a contact is also possible by creeping fuel up to the respective seal 26, 27.

At least in accordance with the first embodiment of FIGS. 2 to 4, the inlet connection 6 can have an inlet connecting piece 29 designed as a separate component, which is added in a suitable manner on to the remaining housing 5. Preferably, a welded connection is used here. The cover 16 is also preferably welded onto the housing 5. The inlet connection 6 can have, in addition, a nozzle 30, which converges in the flow direction. Expediently, the nozzle 30 is constructed in the inlet connecting piece 29. The inlet connecting piece 29 and/or the nozzle 30 can also be realized in the other embodiments shown here, and in further embodiments which are not shown here.

FIGS. 5 to 9 show a second embodiment, in which the heating elements 12 are completely and tightly surrounded by the heating body 13. In addition, in the second embodiment, the heating body 13 is designed in a shell construction, wherein it has a metallic outer shell 31 and two metallic inner shells 32 inserted therein. Between the outer shell 31 and the inner shells 32 an intermediate space 33 is formed, into which the heating elements 12 are inserted. The remaining intermediate space 33 is then plugged with a casting compound 34, whereby the intermediate space 33 is closed hermetically tightly and the heating elements 12 are encapsulated.

The electrical contacting of the heating elements 12 takes place here such that the first electro-connection 14 is electrically connected directly with the metallic outer shell 31, against which the heating elements 12 lie respectively with their outer side forming the first electrical connection 19. The second electro-connection 15 is mounted directly on one of the metallic inner shells 32. The inner shells 32 are directly in contact with one another. In addition, the heating elements 12 are contacted with their inner sides, forming the respective second electrical connection 20, directly with the inner shells 32. Consequently, additional contact elements and conductors can be dispensed with. In particular, provision can be made to configure the inner shells 32 so as to be spring-elastic, and to dimension them so that in the mounted state they prestress the heating elements 12 against the outer shell 31, whereby the contacting of the heating elements 12 with the outer shell 31 on the one hand and with the respective inner shell 32 on the other hand, is improved.

In the example which is shown here, the outer shell 31 has a substantially square cross-section, whereas the two inner shells 32 respectively have a substantially triangular cross-section. The inner shells 32 lie against one another so that with the sides lying against one another they form a diagonal strut 35, which divides an interior of the heating body 13 into two subspaces. The heating body 13 defines here a hollow body, which is open axially at least on one face side. According to FIG. 9, the heating body 13 is inserted into the housing 5 or respectively into the preheating chamber 10 so that it comes in contact with the fuel both by its radial outer side and also by its radial inner side. In addition, in this second embodiment, the housing 5 has an outlet duct 36, which originates from the outlet connection 7 and projects axially into the preheating chamber 10. The heating body 13 is now arranged coaxially to this outlet duct 36 in the housing 5. The fuel path 11 subsequently forms so that it leads from the inlet connection 6 through an outer gap 37, which is formed radially between the housing 5 and the outer side of the heating body 13, through an axial clearance 38, which is formed axially between the housing 5 and a face side of the heating body 13, facing the outlet connection 7, through an inner gap 39, which is formed radially between the outlet duct 36 and the inner side of the heating body 13, around a face side 40 of the outlet duct 36 facing away from the outlet connection 7, and through the outlet duct 36 to the outlet connection 7.

So that the heating body 13, designed as a hollow body, is able to be placed coaxially onto the outlet duct 36 despite its diagonal strut 35, the outlet duct 36 is slotted, for which it has two axial slots 41, lying diametrically opposite one another, into which the diagonal strut 35 is able to be introduced axially.

Figure 10:
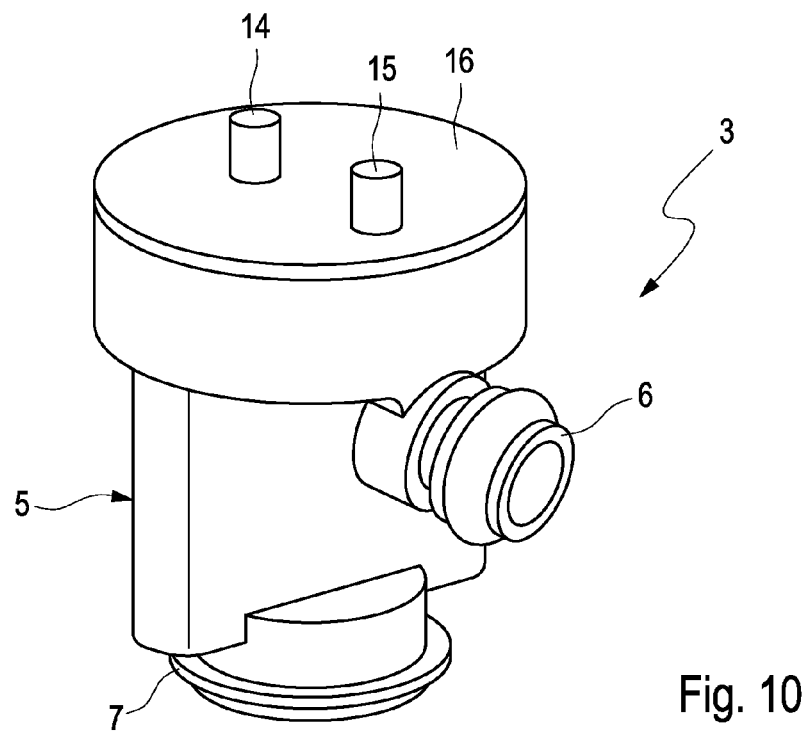
Figure 11:
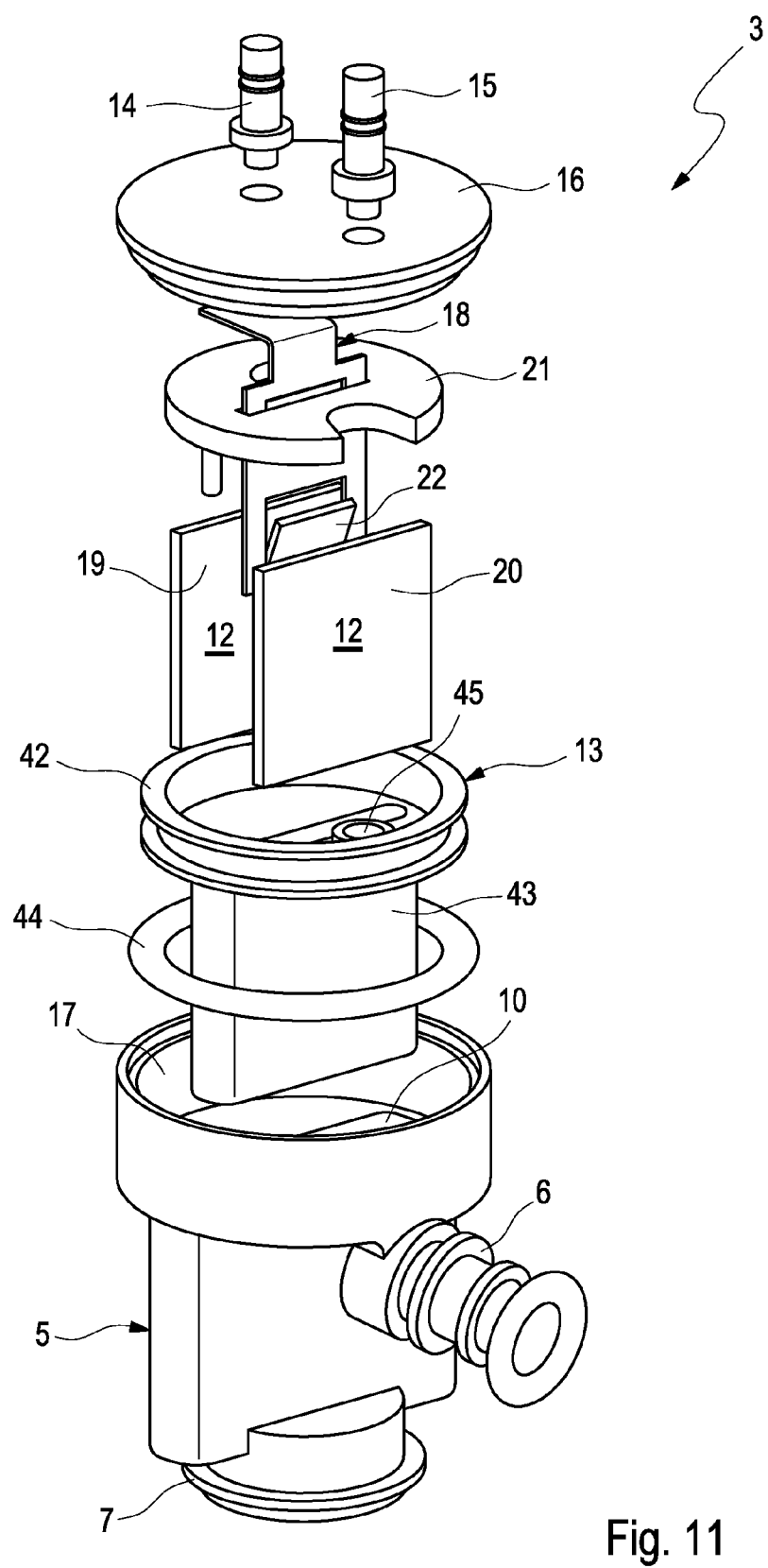
Figure 12:
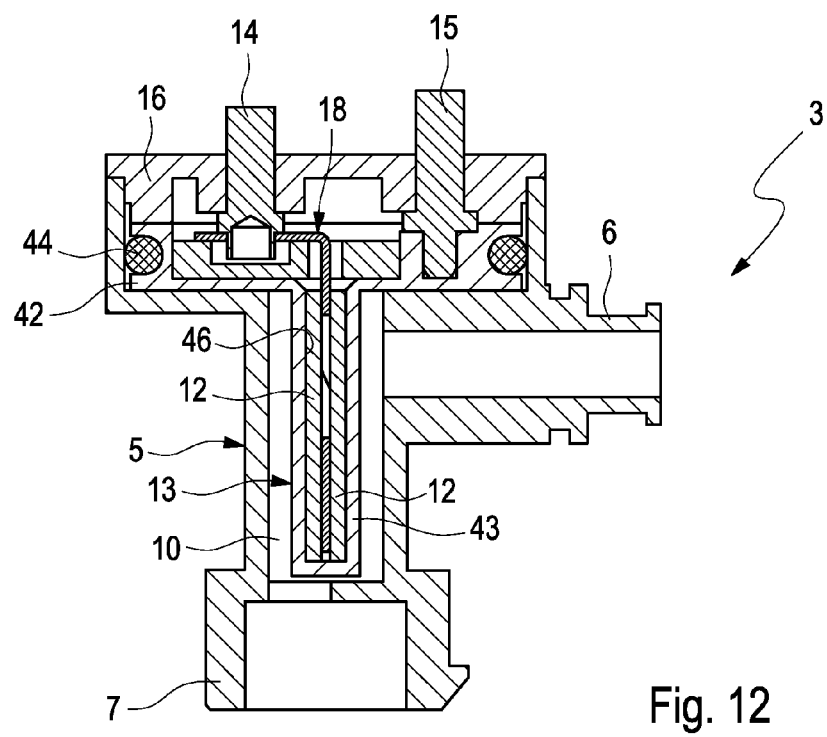
Figure 13:
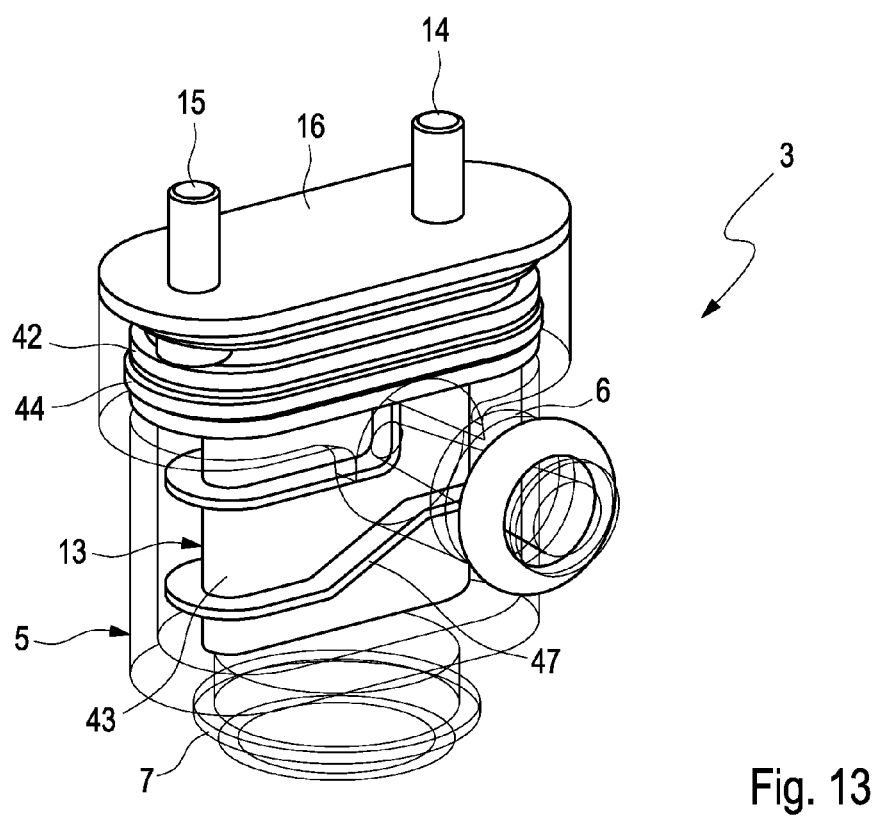
Figure 14:
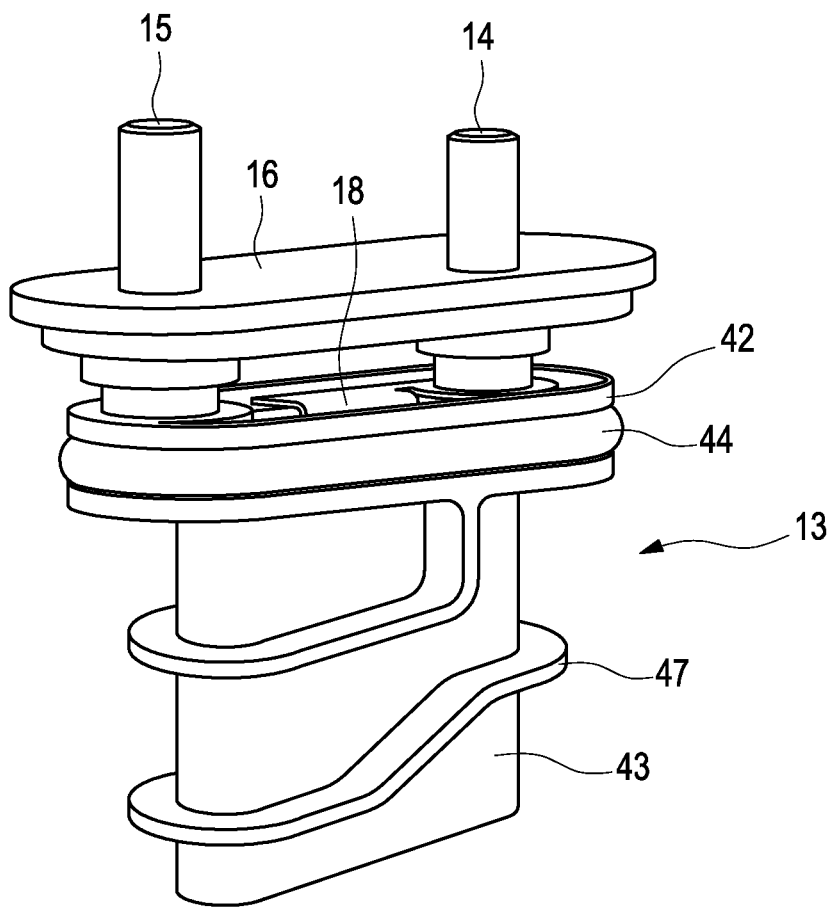
Figure 15:
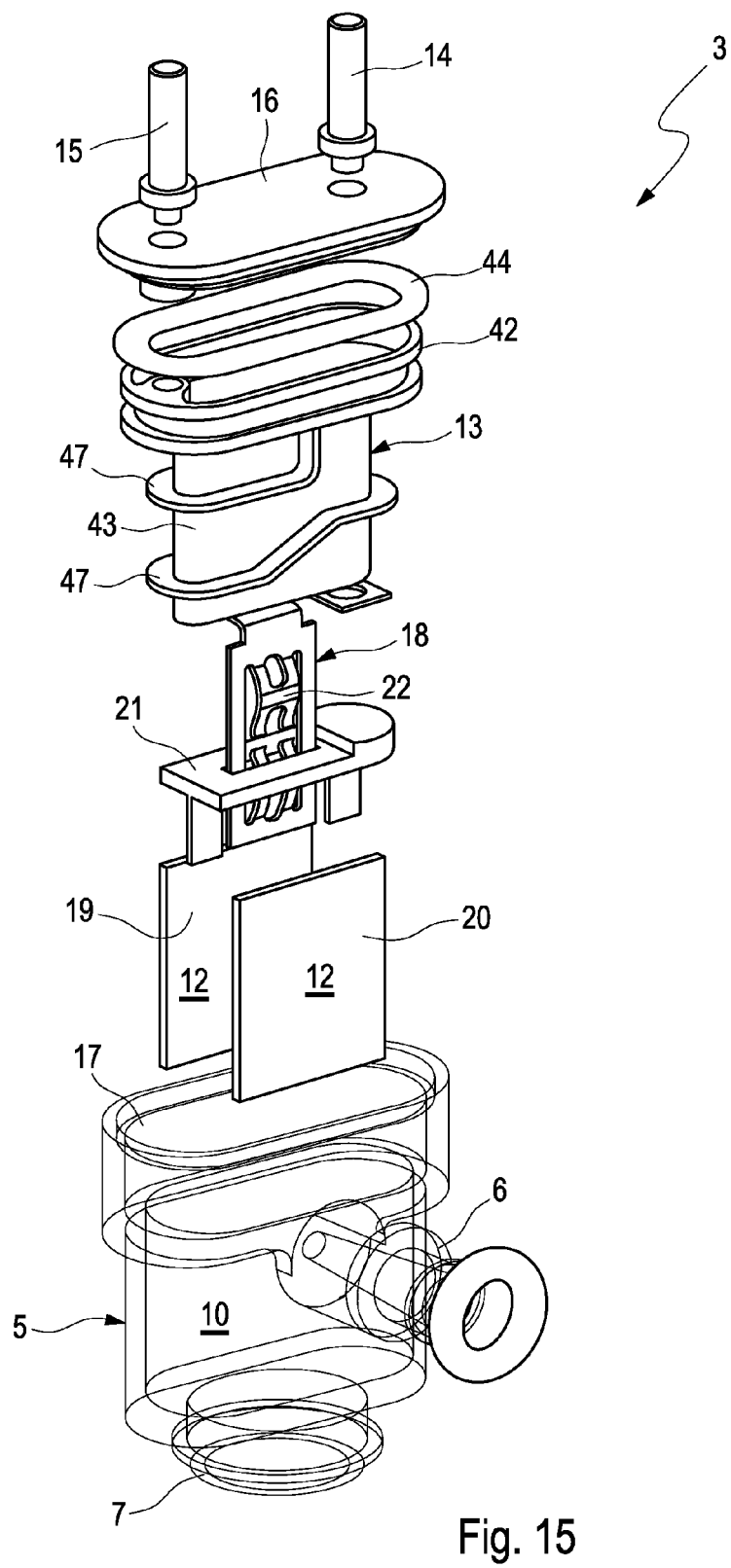
Figure 16:
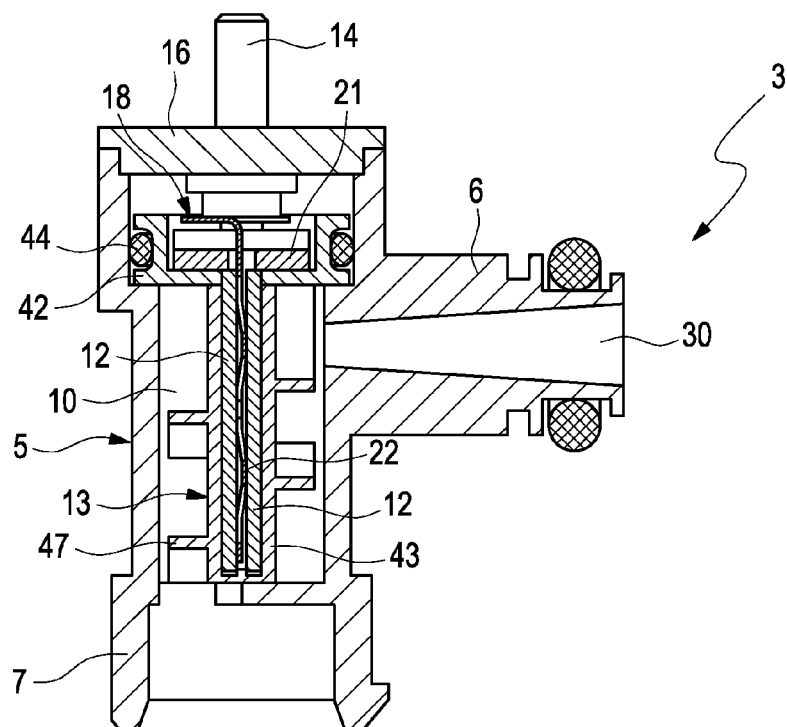
Figure 17:
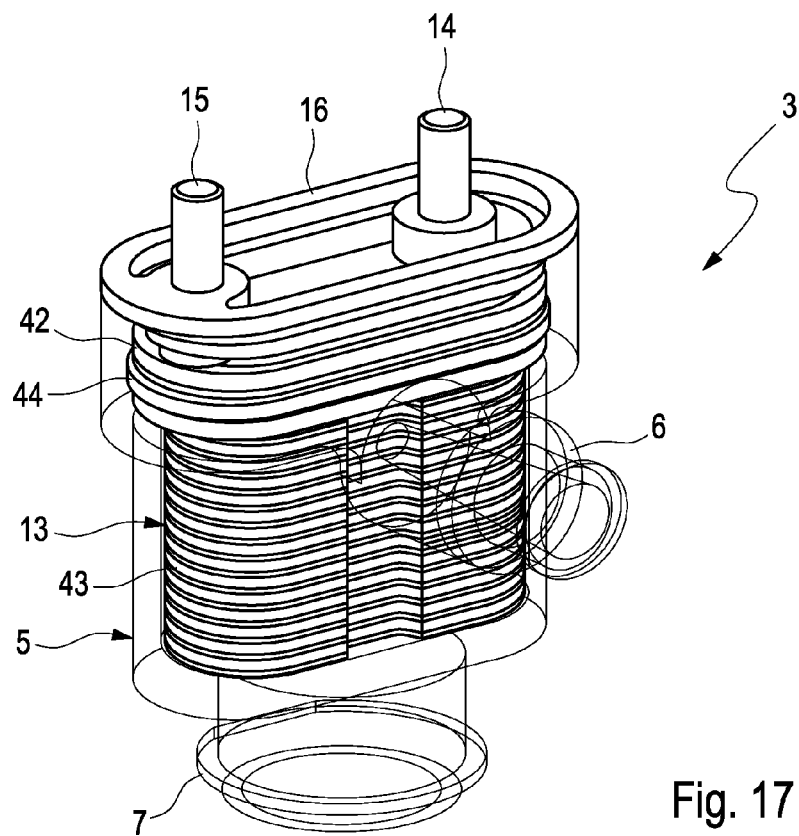
Figure 18:
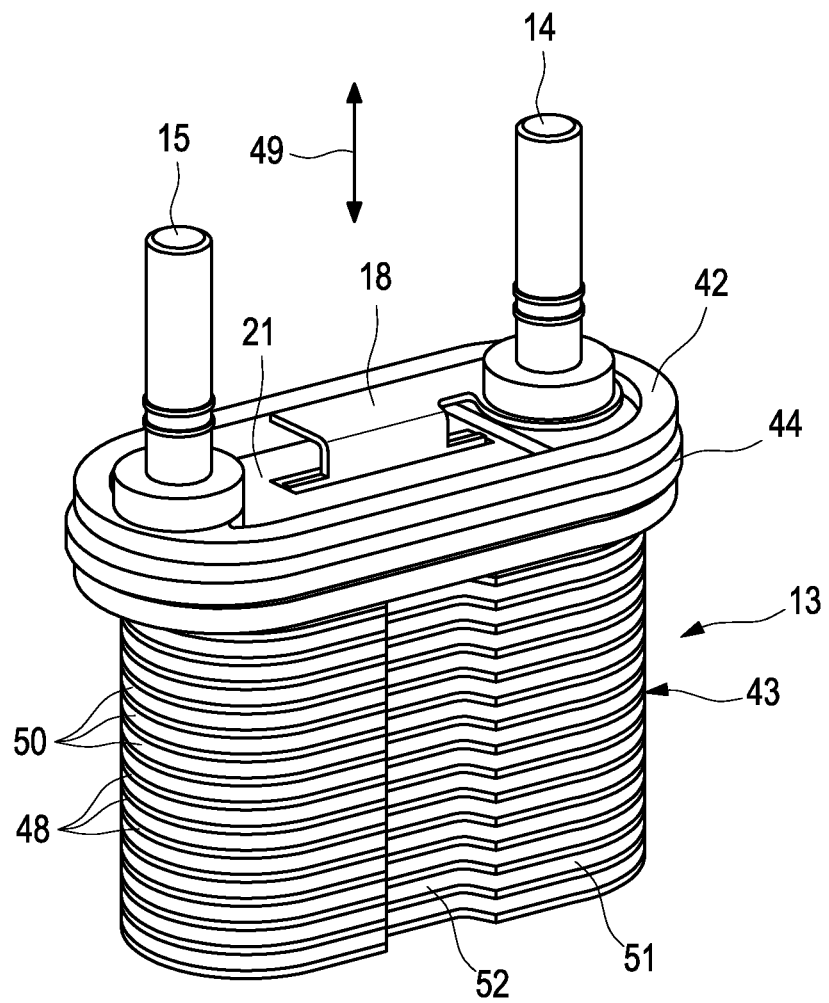
Figure 19:
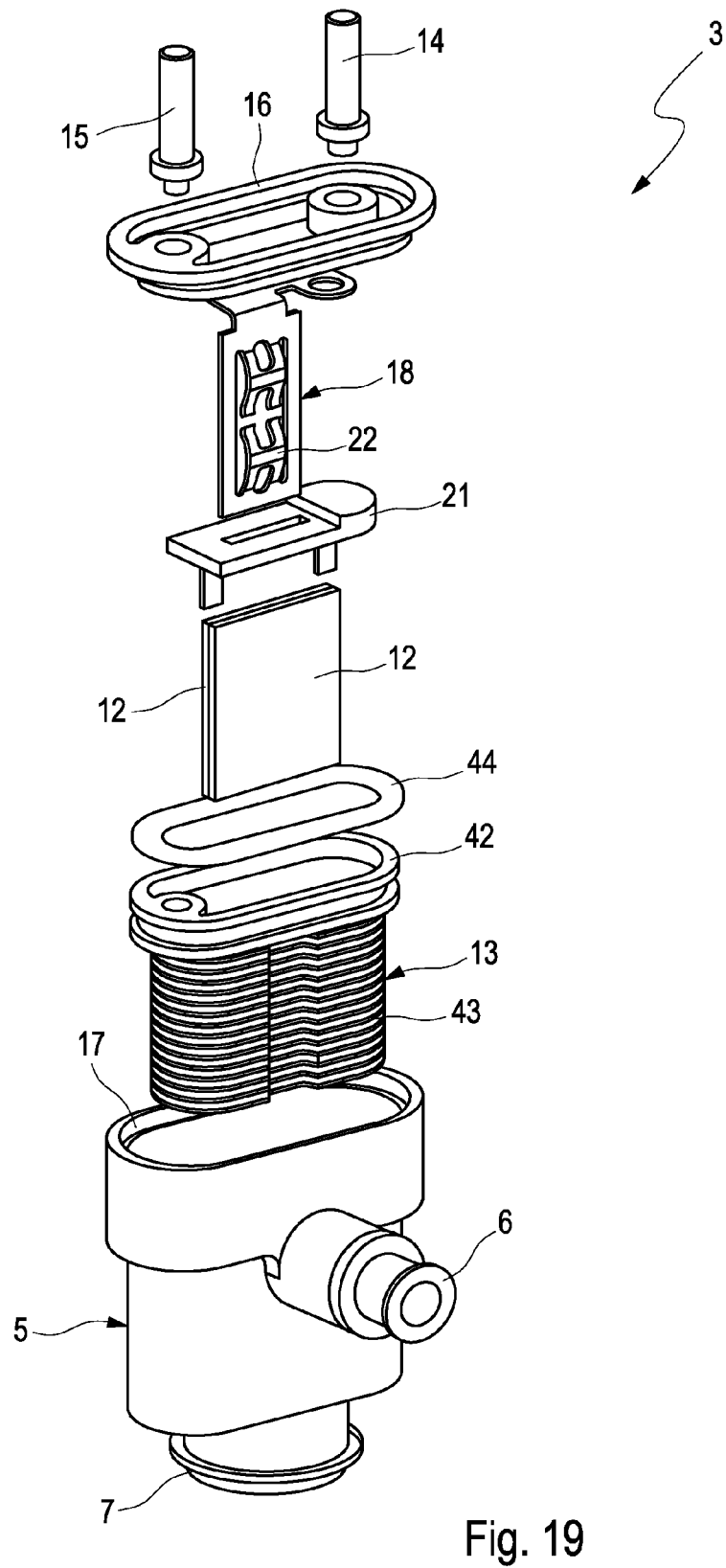
Figure 20:
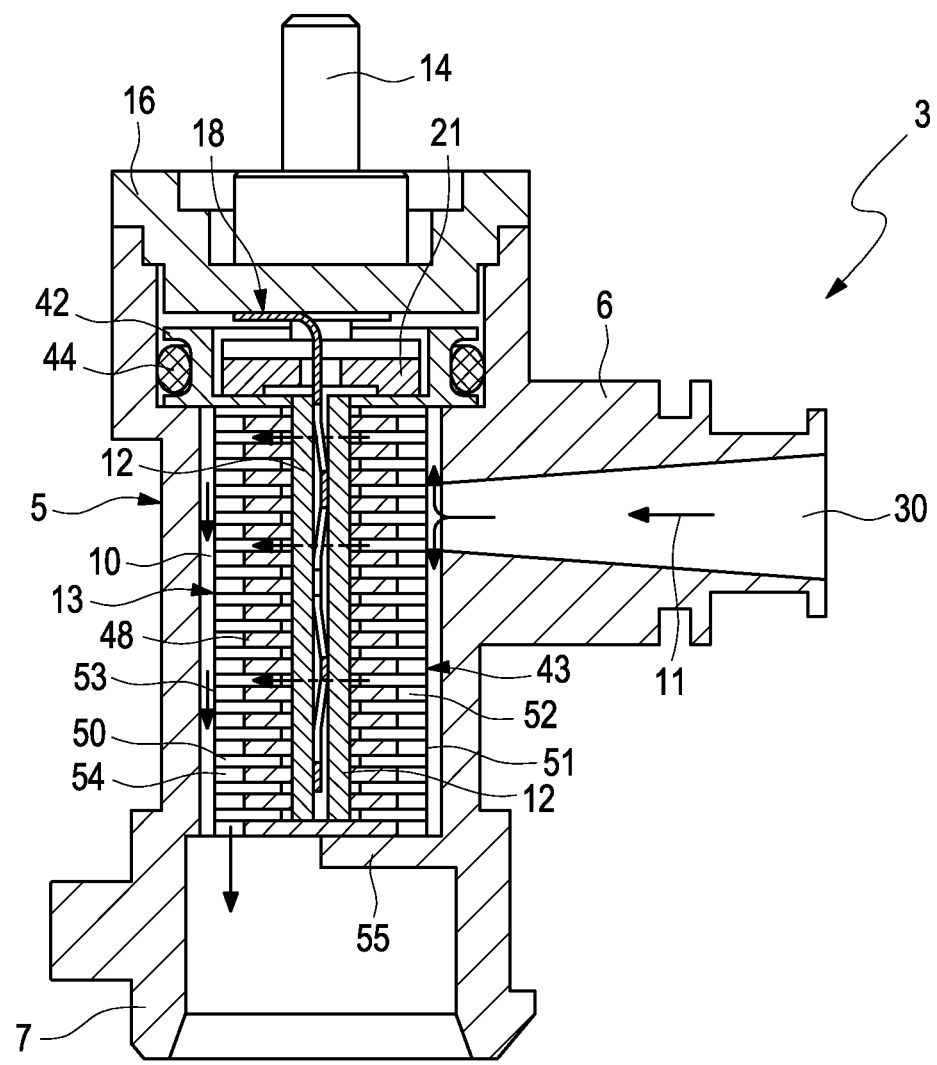

FIGS. 10 to 12 show a third embodiment. FIGS. 13 to 16 show a fourth embodiment and FIGS. 17 to 20 show a fifth embodiment. In the third, fourth and fifth embodiment, the heating body 13 has a base section 42 and a dipping section 43 originating from the base section 42. The dipping section 43 contains the respective heating element 12 and dips so far into the preheating chamber 10 that it comes in contact with the fuel on its outer side. The base section 42 closes the preheating chamber 10 tightly within the housing 5 and has the electro-connections 14, 15. For this, the base section 42 is equipped with a seal 44, which seals the heating body 13 with respect to the housing 5. In addition, a through-opening 45 is formed in the base section 42, through which a receiving space 46 of the dipping section 43 is accessible, which receives the heating elements 12. The electro-connections 14, 15 are also directed here through the cover 16, which is secured to the housing 5.

Here, also, the first electro-connection 14 is directly in contact via the contact element 18 with first electrical connections 19 of the heating elements 12, whilst the second electro-connection 15 is electrically connected directly with the heating body 13, which is directly contacted with the second electrical connections 20 of the two heating elements 12. The contact element 18 also has spring sections 22 here, in order to brace the heating elements 12 with the heating body 13. In addition, an electrical isolator 21 is provided, which is inserted into the base section 42, carries the first electro-connection 14 and isolates the latter and the contact element 18 electrically with respect to the heating body 13.

In the third embodiment, the dipping section 43 is constructed comparatively simply, whereby this embodiment is able to be realized at a particularly favourable cost.

In order to improve the heat transmission between heating body 13 and fuel, according to a fourth embodiment the dipping section 43 can be equipped on its outer side with a flow duct 47, which is configured so that it directs the flow path 11 in the peripheral direction around the dipping section 43. In the preferred embodiment which is shown here, the flow duct 47 projects outwards from the dipping section 43 and winds helically around the dipping section 43, and namely for example over approximately 540°. Hereby, the length of the fuel path 11 in the preheating chamber 10 can be significantly increased.

In the fifth embodiment, the heat transmission between the dipping section 43 and the fuel is improved in that the dipping section 43 has several ribs 48 on its outer side, which extend transversely to an axial direction 49 aligned to the outlet connection 7, and which in addition are spaced apart from one another in this axial direction 49. Hereby, intermediate spaces 50 are produced between the adjacent ribs 48, through which spaces the fuel path 11 leads. The ribs 48 can be configured circumferentially in a closed manner in the peripheral direction, whereby they are plate-shaped.

The dipping section 43 has on an inlet side 51 facing the inlet connection 6 an axially-running distributor duct 52, which extends here through all the ribs 48. On the outlet side 53, facing away from the inlet side 51, the dipping section 43 can have a likewise axially-running collecting duct 54, lying diametrically opposite the distributor duct 52, which collecting duct likewise expediently extends through all the ribs 48. According to FIG. 20, the outlet connection 7 is only open towards the preheating chamber 10 in the region of the outlet side 53, whereas towards the inlet side 51 it is closed with respect to the preheating chamber 10, for example by means of a wall section 55. The fuel following the fuel path 11 can be distributed along the distributor duct 52 on all the ribs 48 and therefore can flow through the intermediate spaces 50 over the entire axial height of the dipping section 43. At the outlet side 53, the fuel can then enter from all intermediate spaces 50 into the collecting duct 54 and from the latter can arrive at the outlet connection 7.

Figure 21:
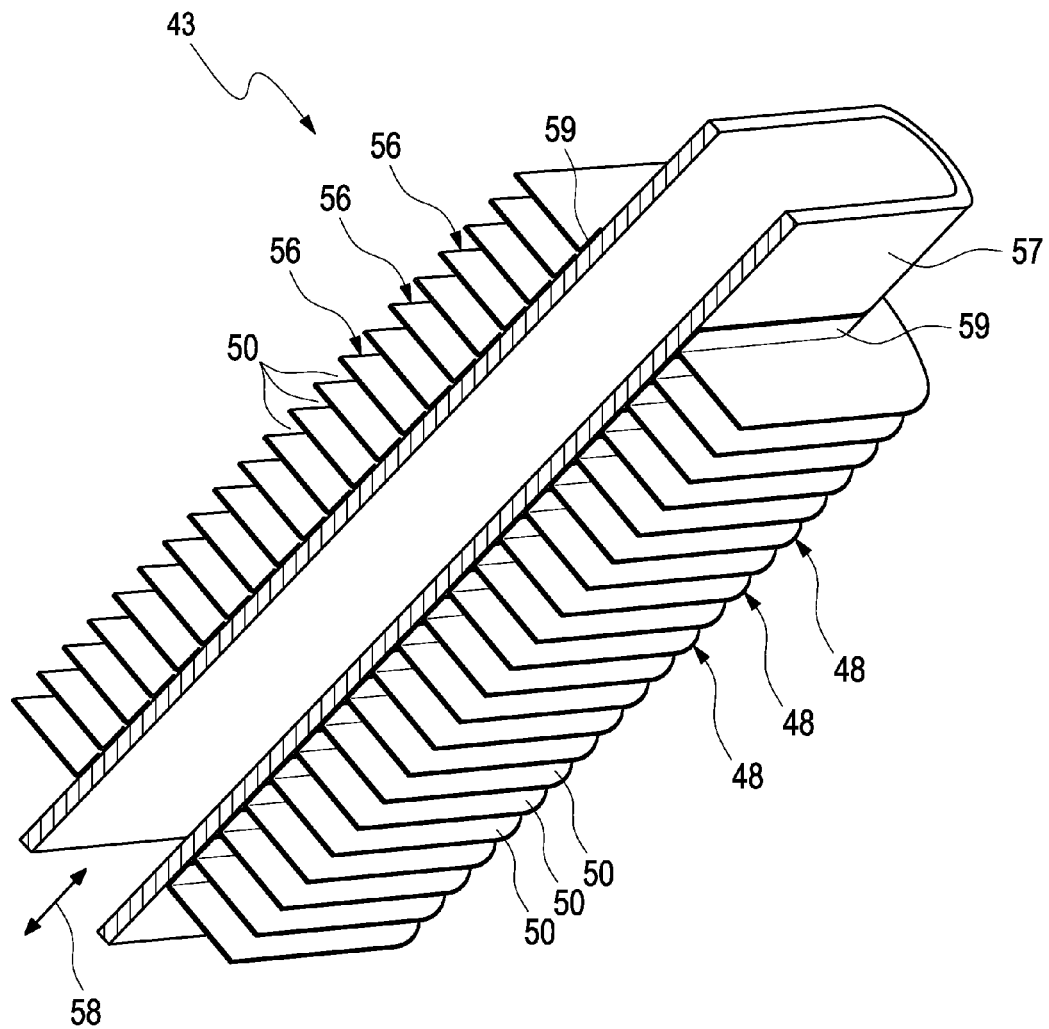
Figure 22:
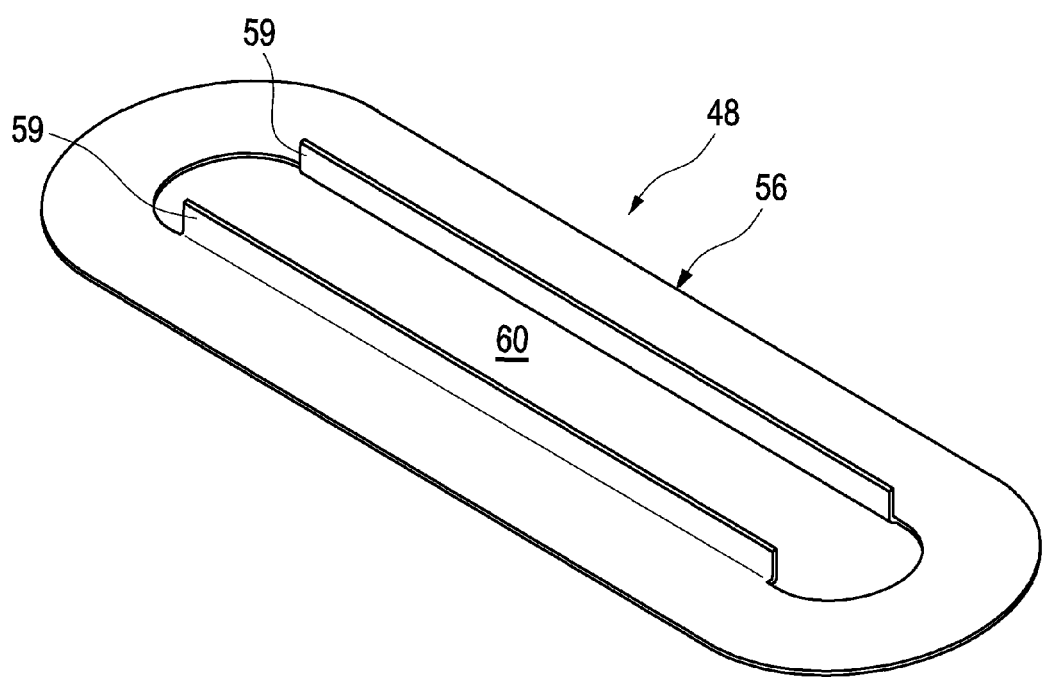

According to FIGS. 21 and 22, the ribs 48 can be formed by a plurality of individual plates 56, which are fastened individually on a supporting body 57 of the dipping section 43, such that they are spaced apart from one another in a stacking direction 58, in order to form the intermediate spaces 50.

For fixing to the supporting body 57, the respective plate 56 can have internally angled collar sections 59, which are formed on an edge of a central through-opening 60 of the respective plate 56. The supporting body 57 is directed through the respective opening, wherein the collar sections 59 lie against the supporting body 57. A sufficient fixing can be realized here by means of clamping forces. In particular, however, a soldered connection is also conceivable.

Figure 23:
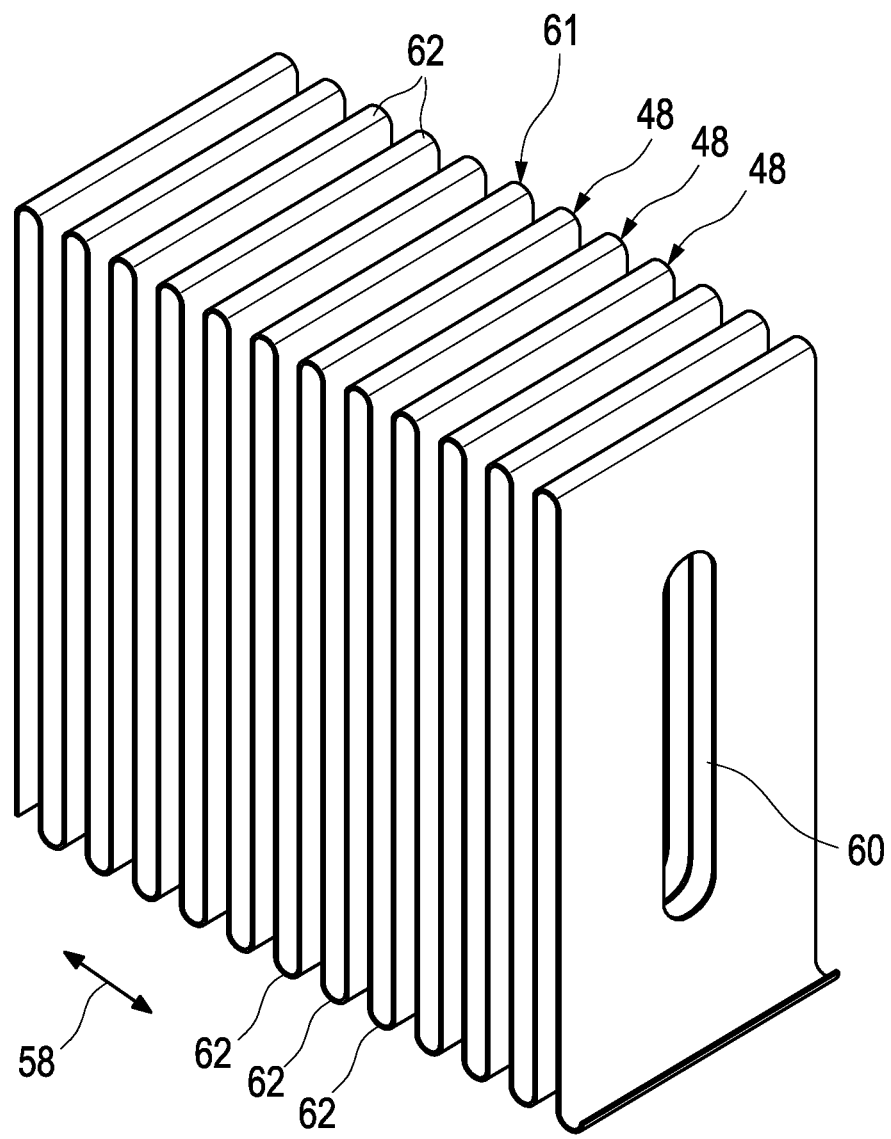

FIG. 23 shows another embodiment for realizing the ribs 48. Here, a strip material 61 is used, which is bent or respectively folded several times in an undulating manner, such that several longitudinal sections of the strip material 61 are arranged parallel to one another and spaced apart from one another, in order to form the said ribs 48. Here, also, the ribs 48 are spaced apart from one another in the stacking direction 58. In addition, the individual ribs 48 also have a central through-opening 60 here, through which the supporting body 57 is able to be directed. Adjacent ribs 48 are connected with one another respectively by a bend section 62, whereby several ribs 48, preferably all the ribs 48, can be realized with a single continuous strip material 61. The fixing to the supporting body 57 can also take place here either by means of clamping forces or by means of soldered connections.

The invention claimed is:

1. A preheating device for an internal combustion engine, comprising:
    an inlet connection for connecting a distributor rail of a fuel injection system;
    an outlet connection for connecting a fuel injector of the fuel injection system;
    a preheating chamber flowable through by a fuel flow, the preheating chamber fluidically connected with the inlet connection and the outlet connection;
    at least one electrical heating element for heating the fuel flow in the preheating chamber, the at least one electrical heating element having an electrical connection for receiving electrical power and providing heat;
    at least one metallic heating body exposed to the fuel flow in the preheating chamber, wherein the at least one metallic heating body receives the at least one electrical heating element; and the at least one metallic heating body is in heat transferring contact with the at least one electrical heating element;
    wherein the at least one electrical heating element is completely and securely surrounded by the at least one metallic heating body, the at least one metallic heating body shielding the at least one electrical heating element from direct contact with the fuel flow; and
    wherein the at least one metallic heating body includes at least one inner shell and at least one outer shell, and the at least one electrical heating element is arranged in an intermediate space between the at least one inner shell and the at least one outer shell, and wherein the intermediate space is closed off from the fuel flow in the preheating chamber.

2. The preheating device according to claim 1, further comprising:
    a first electro-connection and a second electro-connection each being connectable to an electrical energy supply;

a contact element electrically connected to the first electro-connection, the contact element further electrically connected with the electrical connection of the at least one electrical heating element;

wherein the second electro-connection is electrically connected with the at least one metallic heating body, and the at least one metallic heating body is electrically connected with a second electrical connection of the at least one electrical heating element.

3. The preheating device according to claim 2, wherein the contact element is at least one of configured as a spring and includes at least one elastic section to prestress the at least one electrical heating element against the at least one metallic heating body.

4. The preheating device according to claim 1, wherein the at least one metallic heating body surrounds the preheating chamber and includes an inlet connected fluidically with the inlet connection, and an outlet connected fluidically with the outlet connection, and wherein the at least one metallic heating body is arranged in and sealed with respect to a housing, which has the inlet connection and the outlet connection, the at least one metallic heating body including an inner side facing the preheating chamber in fluid contact with the fuel flow.

5. The preheating device according to claim 1, wherein the at least one metallic heating body defines an axially open hollow body, and wherein the axially open hollow body is arranged in the preheating chamber and contacts the fuel flow with at least one of a radial outer side and a radial inner side.

6. The preheating device according to claim 5, wherein:
the inlet connection and the outlet connection are disposed on a housing, the housing surrounding the preheating chamber and including an outlet duct, originating from the outlet connection, projecting axially into the preheating chamber,
the at least one metallic heating body is arranged in the housing and extends coaxially to the outlet duct, and
a fuel path extending from the inlet connection through an outer gap disposed between the housing and the radially outer side of the at least one metallic heating body, through an axial clearance disposed between the housing and a face side of the at least one metallic heating body facing the outlet connection, through an inner gap disposed between the outlet duct and the radially inner side of the at least one metallic heating body, and through the outlet duct to the outlet connection.

7. The preheating device according to claim 1, wherein:
the at least one metallic heating body further includes a base section and a dipping section extending from the base section,
the dipping section containing the at least one electrical heating element and defining a profile dipping into the preheating chamber in contact with the fuel flow on an outer side of the dipping section, and
wherein the base section closes the preheating chamber inside a housing, the base section including at least one electro-connection for supplying the at least one electrical heating element with electrical energy.

8. The preheating device according to claim 7, wherein the dipping section includes a flow duct on the outer side, wherein the flow duct directs a fuel path extending from the inlet connection to the outlet connection in a peripheral direction at least partially around the dipping section.

9. The preheating device according to claim 7, wherein the outer side of the dipping section includes a plurality of ribs extending transversely to an axial direction, the axial direction corresponding to the outlet connection, the plurality of ribs spaced apart from one another in the axial direction, and wherein a fuel path extends between at least two adjacent ribs, the flow path fluidically connecting the inlet connection to the outlet connection.

10. The preheating device according to claim 8, wherein the flow duct projects away from the dipping section and extends helically around the dipping section.

11. The preheating device according to claim 9, wherein at least one of:
the dipping section further includes an axially-extending distributor duct on an inlet side facing the inlet connection the distributor duct extending through at least one of the ribs,
the outlet connection is open to the preheating chamber on an outlet side of the dipping section facing away from the inlet connection, and wherein the outlet connection is closed on an inlet side facing the inlet connection, and
the dipping section further includes an axially-extending collecting duct on an outlet side facing away from the inlet connection, the collecting duct extending through at least one of the ribs.

12. The preheating device according to claim 1, wherein the at least one electrical heating element is a PTC element, the PTC element defining two outer sides facing away from one another, and wherein the two outer sides each include an electrical connection.

13. A preheating device for an internal combustion engine, comprising:
a housing including an inlet connection for connecting to a distributor rail of a fuel injection system and an outlet connection for connecting to a fuel injector of the fuel injection system;
a preheating chamber defined in the housing and disposed in a flow path between the inlet connection and the outlet connection, the preheating chamber fluidically connected with the inlet connection and the outlet connection for communicating a fluid;
at least one metallic heating body disposed in the preheating chamber of the housing and exposed to the fluid in the flow path;
at least one electrical heating element for heating the fuel flow in the preheating chamber, the at least one electrical heating element disposed in the at least one metallic heating body;
the at least one electrical heating element covered from the flow path by the at least one metallic heating body to facilitate avoiding direct contact between the at least one electrical heating element and the fluid in the preheating chamber;
wherein the at least one metallic heating body includes at least one inner shell and at least one outer shell, and the at least one electrical heating element is arranged in an intermediate space between the at least one inner shell and the at least one outer shell, the intermediate space being sealed off from the flow path: and
wherein the at least one metallic heating body is spaced apart from a wall of housing surrounding the preheating chamber, and wherein the at least one inner shell and the at least one outer shell are exposed to the flow path in the preheating chamber.

14. The preheating device according to claim 13, wherein the at least one metallic heating body is structured to surround and hermetically encapsulate the at least one electrical heating element to protect the at least one electrical heating element from direct contact with the fluid.

15. The preheating device according to claim 13, wherein the at least one inner shell surrounds an interior, and the at least one metallic heating body further includes a transverse strut extending in the interior.

16. A preheating device for an internal combustion engine, comprising:
- a housing including an inlet connection for connecting to a distributor rail of a fuel injection system and an outlet connection for connecting to a fuel injector of the fuel injection system;
- a preheating chamber defined in the housing and disposed in a flow path between the inlet connection and the outlet connection, the preheating chamber fluidically connected with the inlet connection and the outlet connection for communicating a fluid;
- at least one metallic heating body disposed in the preheating chamber of the housing and exposed to the fluid in the flow path;
- at least one electrical heating element for heating the fuel flow in the preheating chamber, the at least one electrical heating element disposed in the at least one metallic heating body;
- the at least one electrical heating element covered from the flow path by the at least one metallic heating body to facilitate avoiding direct contact between the at least one electrical heating element and the fluid in the preheating chamber;
- wherein the at least one metallic heating body includes at least one inner shell and at least one outer shell, and the at least one electrical heating element is arranged in an intermediate space between the at least one inner shell and the at least one outer shell, the intermediate space being sealed off from the flow path; and
- wherein the at least one metallic heating body is arranged in the preheating chamber coaxial to the outlet connection of the housing, and wherein the at one metallic heating body includes a radial inlet and an axial outlet.

17. The preheating device according to claim 16, wherein the at least one electrical heating element is a PTC element.

18. The preheating device according to claim 16, wherein the intermediate space is sealed with a synthetic resin.

* * * * *